UNITED STATES PATENT OFFICE 2,440,527

ACETYLENE TORCH CUTTER SUPPORT

Hyrum M. Talley, Alhambra, Calif., assignor to American Pipe and Steel Corporation, Alhambra, Calif., a corporation of California Application September 4, 1944, Serial No. 552,648

4 Claims. (Cl. 280—29)

This invention relates to a support for use by burners or cutters who cut steel plates and the like with acetylene torches.

An object of the invention is to provide a sturdy, simple and highly economical construction for supporting the forearm of the burner or cutter on the steel plate that he may be cutting with an acetylene torch so that his forearm may be rollably supported for movement in any direction or operationally may be supported upon a central pivot in cutting arcs or circles.

In cutting steel plates with acetylene torches it has heretofore been common practice for the operator to rest one forearm on the plate that is being cut and to slide the torch through the end of that forearm while making the cut. The plate is apt to become heated from the torch to the discomfiture of the operator and frequently small particles of molten metal or slack are blown by the torch up the operator's sleeve. By means of the present support the forearm of the operator is supported above the plate so that it will not be heated thereby and the attaching means serves to close the bottom of the operator's sleeve. Any hot metal that is blown over the surface of the plate by the torch may consequently be blown beneath the operator's forearm. At the same time the operator's forearm is nicely supported for movement in any direction over the plate.

Another object of the invention is to provide a support for acetylene torch cutters wherein there is a table that supports the forearm which table is in turn supported by balls that are free to rotate in any direction with the balls being arranged close together in a direction transverse of the table so that they may collectively ride an edge of a plate that may be desired to be bevelled.

With the foregoing and other objects in view, which will be made manifest in the following detailed description and specifically pointed out in the appended claims, reference is had to the accompanying drawings for an illustrative embodiment of the invention, wherein:

Fig. 1 is a view in side elevation of the torch cutter's support embodying the present invention.

Fig. 2 is an end view in elevation of the same.

Fig. 3 is a top plan view of the same.

Fig. 4 is a view illustrating the manner in which the device may be used in cutting a bevel on the edge of a plate.

Referring to the accompanying drawings wherein similar reference characters designate similar parts throughout, the device embodying the present invention consists of a trough-shaped table 10 of such length and width as to conveniently accommodate the forearm of an acetylene torch cutter or burner. The sides of this table may be slotted as indicated at 11 to accommodate attaching straps 12 or the equivalent that are designed to encircle the forearm and attach the table thereto. On the underside of the table there are a plurality of sockets 13 that are rigidly secured to the table and each socket has a ball 14 rotatably retained therein for rotation in any direction. At approximately the geometrical center of the table there is provided a box 15 into which is screwed a pointed stud 16 locked in adjusted position by means of a jam nut 17. This stud may assume a retracted position as illustrated in Fig. 1 or may be projected to extend downwardly below the balls to form a central pivot for the support.

As illustrated in Fig. 4 the ball of adjacent pairs are relatively close together in a direction transverse of the table 10 so that these balls may cooperatively straddle a corner of a steel plate S when it is desired to bevel the edge of the plate using an acetylene torch for this purpose.

During normal operation the cutter or burner straps the table 10 on to his forearm and in the course of cutting he rollably moves the table in any direction required by the direction or line of cut. The balls being rotatable about their own centers do not interfere or hinder with the shifting of the table in any direction as might be the case if casters were employed for this purpose. In the event that a cut is to be taken on an arc or a circular opening is to be cut in a plate, the stud 16 may be advanced so as to form a central pivot about which the table may be rotated as indicated by the arrows on Fig. 3. In some instances it is desirable to bevel the edge of the plate in which case the pairs of balls are caused to straddle the corner as indicated at Fig. 4 and roll along the edge of the plate while the bevelling cut is being made.

It will be appreciated that the forearm of the operator is at all times supported above the surface of the plate so that it will not be heated thereby. The encircling straps serve to close the operator's sleeve and any flying particles of hot metal may freely pass along the plate beneath the table 10.

Various changes may be made in the steps of the process without departing from the spirit and scope of my invention as claimed.

I claim:

1. An acetylene torch cutter's support comprising a table adapted to support the forearm of the operator, means for fastening the table to the forearm of the operator and a plurality of balls mounted for rotation on the underside of the table and serving to rollably support the same for movement in any direction, said balls being arranged close together in a direction transverse of the table and sufficiently spaced from the underside of the table so that they may ride a right angled edge of a plate to be bevelled without the edge contacting the underside of the table.

2. An acetylene torch cutter's support comprising a table adapted to support the forearm of the operator, means for fastening the table to the forearm of the operator, a plurality of balls mounted for rotation on the underside of the table and serving to rollably support the same for movement in any direction, and a pointed stud adjustably mounted upon the underside of the table.

3. An acetylene torch cutter's support comprising a table adapted to support the forearm of the operator, means for fastening the table to the forearm of the operator, a plurality of balls mounted for rotation on the underside of the table and serving to rollably support the same for movement in any direction, and a pointed stud adjustably mounted upon the underside of the table, said stud being located at approximately the geometrical center of the table.

4. An acetylene torch cutter's support comprising a trough-shaped table, a plurality of balls rotatably mounted upon the underside of the table and service to support the same, means for attaching the table to the forearm of an operator, and an adjustable stud adjustably mounted on the underside of the table intermediate the balls.

HYRUM M. TALLEY.

REFERENCES CITED

The following references are of record in the file of this patent:

UNITED STATES PATENTS

| Number | Name | Date |
|---|---|---|
| 429,657 | Spivey | June 10, 1890 |
| 1,351,731 | Baldwin | Sept. 7, 1920 |
| 1,547,166 | Davidson | July 28, 1925 |
| 1,737,836 | Field | Dec. 3, 1929 |

FOREIGN PATENTS

| Number | Country | Date |
|---|---|---|
| 140,372 | Switzerland | Aug. 1, 1930 |
| 167,454 | Switzerland | May 1, 1934 |
| 607,328 | France | Mar. 26, 1926 |
| 727,318 | France | Mar. 22, 1932 |